United States Patent [19]

Iba

[11] Patent Number: 4,627,693

[45] Date of Patent: Dec. 9, 1986

[54] TRANSMISSION TYPE ILLUMINATING DEVICE FOR STEREOMICROSCOPES

[75] Inventor: Yoichi Iba, Hachiouji, Japan

[73] Assignee: Olympus Optical Co., Ltd., Tokyo, Japan

[21] Appl. No.: 672,355

[22] Filed: Nov. 16, 1984

[30] Foreign Application Priority Data

Nov. 22, 1983 [JP] Japan ................................ 58-220261
Nov. 22, 1983 [JP] Japan ................................ 58-220262
Nov. 22, 1983 [JP] Japan ................................ 58-220263

[51] Int. Cl.$^4$ .......................................... G02B 21/06
[52] U.S. Cl. ................................................ 350/523
[58] Field of Search ............... 350/515, 516, 518, 519, 350/520, 523, 524, 525, 526, 527, 528

[56] References Cited

U.S. PATENT DOCUMENTS

| 2,078,586 | 4/1937 | Richter | 350/523 |
| 4,063,797 | 12/1977 | Taira | 350/523 |
| 4,253,726 | 3/1981 | Taira | 350/526 |
| 4,518,231 | 5/1985 | Muchel et al. | 350/516 |

FOREIGN PATENT DOCUMENTS

| 2024114 | 10/1975 | Fed. Rep. of Germany . | |
| 16-5808 | 3/1941 | Japan . | |
| 0007325 | 1/1984 | Japan | 350/523 |

Primary Examiner—John K. Corbin
Assistant Examiner—Vincent J. Lemmo
Attorney, Agent, or Firm—Cushman, Darby & Cushman

[57] ABSTRACT

A transmission type illuminating device for stereomicroscopes formed by arranging in the order mentioned a light source, a collector lens, a pair of light source image forming lenses located in positions symmetrical with respect to the optical axis of the collector lens and a relay lens for light source images arranged on the same optical axis as of the collector lens in order that a uniform bright illumination may be always made irrespective of the magnification and a wide uniform oblique light illumination may be also easily made. The light source is arranged in a position conjugate with a sample placing surface with respect to the collector lens and relay lens for the light source image and the pair of light source image forming lenses are so arranged that their respective optical axis may coincide respectively with a pair of rays from the light source intersecting at the sample placing surface and respectively entering a pair of entrance pupils of a stereomicroscope and the light source images to be formed by the pair of light source image forming lenses may be in positions conjugate respectively with the above mentioned pair of entrance pupils with respect to the relay lens for light source images.

12 Claims, 6 Drawing Figures

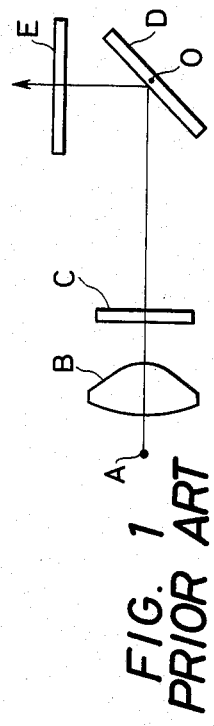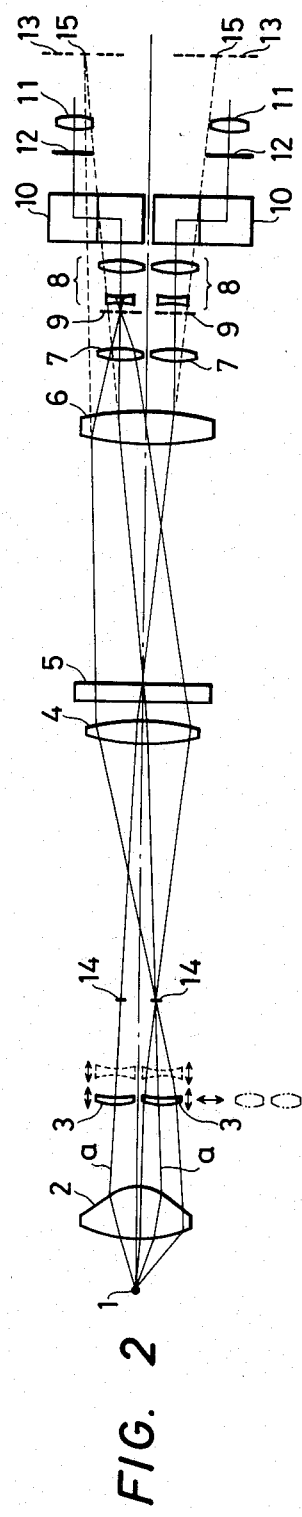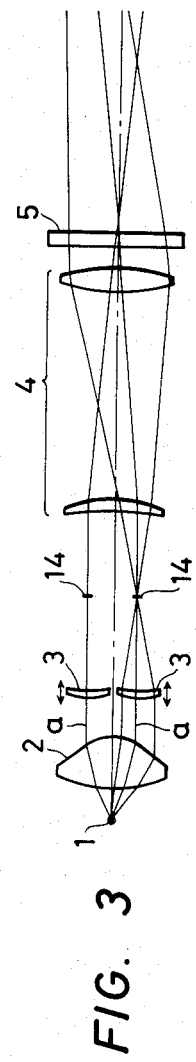
FIG. 1 PRIOR ART
FIG. 2
FIG. 3

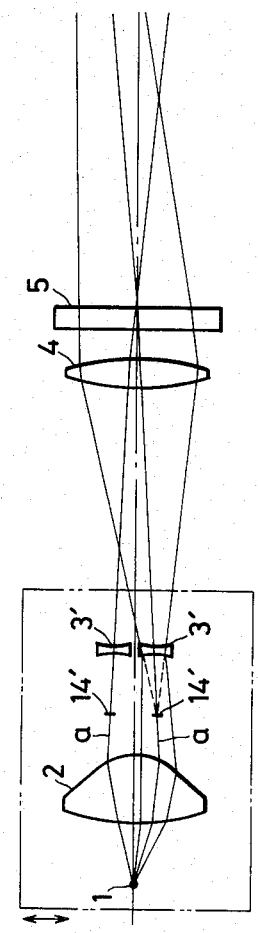
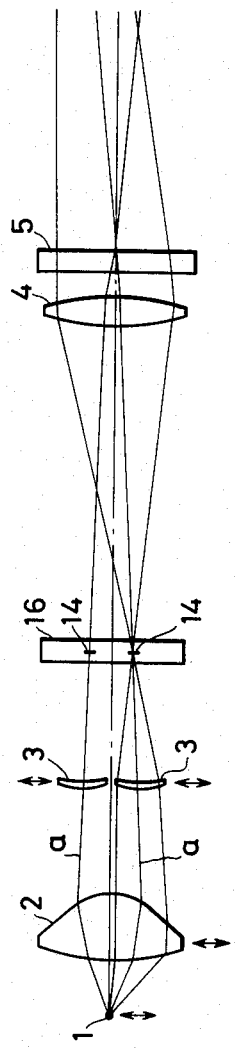
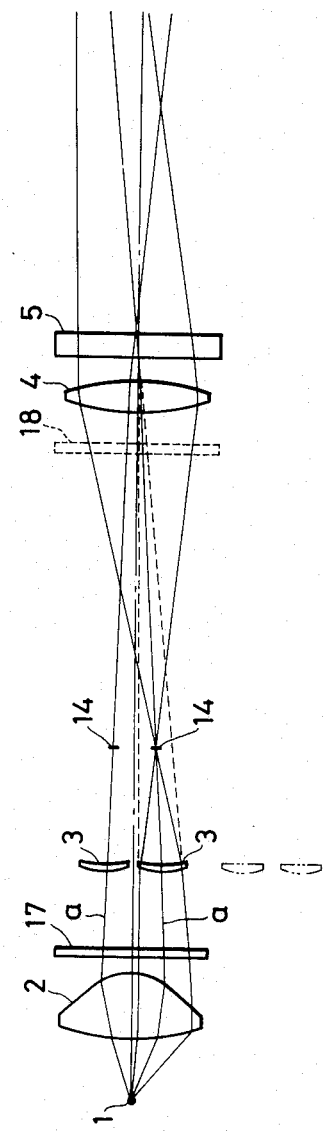
FIG. 4
FIG. 5
FIG. 6

TRANSMISSION TYPE ILLUMINATING DEVICE FOR STEREOMICROSCOPES

BACKGROUND OF THE INVENTION (a) Field of the invention

This invention relates to a transmission type illuminating device for stereomicroscopes.

(b) Description of the prior art

In such conventional transmission type illuminating device of the kind as is disclosed, for example, in Japanese Utility Model Laid-Open No. 5808/1966, a frosted glass is arranged in a position conjugate with the entrance pupil of a stereomicroscope with respect to a condensor lens and is illuminated from the back to be used as a secondary light source so that a so-called Kohler illumination may be made. However, generally, in the Kohler illumination, unless the intensity of the beam emitted from the light source is constant irrespective of the direction, a sample will not be able to be uniformly illuminated. However, there has been a problem that, in such case of a light source consisting of a frosted glass illuminated from the back as in this conventional example, the beam intensity will vary so much depending on the direction that the illumination will fluctuate. There has been also a problem that, if the surface of the frosted glass is made rougher, the illumination fluctuation will tend to reduce but, in such case, the illumination efficiency will reduce and a bright illumination will be difficult. There has been also a problem that, as there are two entrance pupils in the stereomicroscope, in order to make a Kohler illumination which is an ideal, the illuminating optical system will become complicated. Further, there has been also a problem that, though most of the stereomicroscopes have magnification varying mechanisms, the position and aperture of the entrance pupil will vary with the magnification variation. Therefore, the Kohler illumination forming the image of the light source in the entrance pupil of the observation system will become imperfect. There has been also a problem that particularly, on the high magnification side, the F number will increase so much that the observed image will become dark but, in the above mentioned conventional example, in such case, no sufficient observation light amount will be able to be secured. There has been also a problem that, in a simple objective type stereomicroscope, the magnification can be varied by varying the focal distance by replacing the objective lens or by adding an adapter lens but, in such case, the position of the entrance pupil will move so much that the position conjugate with it will deviate from the frosted glass and therefore, in the above mentioned conventional example, only when an objective lens having a specific focal distance is used, the stereomicroscope will be able to be used.

Further, in some conventional transmission type illuminating devices, in order that even a transparent sample may be observed with a high contrast, the general bright visual field illumination can be switched over to an oblique light illumination. It is so formed that the illumination light is diffused by illuminating a frosted glass from the back with a light source A and collector lens B and the diffused light is reflected with a mirror D to illuminate a sample on a stage glass E and, when an oblique light illumination is to be made, the mirror D is rotated by a proper amount with the point O as a center to incline the illuminating light entering the stage glass E. However, there has been a problem that, in the case of this conventional example, the light diffusing force of the frosted glass C can not be made strong enough to obtain a large oblique light illumination effect, the effective aperture of the collector lens B can not be made large due to the restriction in fitting and thereby particularly, in the case of an oblique light illumination, only an illumination in a limited range can be made. In the transmission type illuminating device desclosed in the above mentioned Japanese Utility Model Laid-Open No. 5808/1966, an oblique light illumination is realized by knife-edging a part of the above mentioned frosted glass to interrupt the light so as to enter only a part of the entrance pupil. However, in order to obtain a uniform illumination effect with the Kohler illumination, the intensity of the light emitted from the secondary light source must be constant irrespective of the direction and therefore, in such case that the frosted glass is a secondary light source as in the conventional example, it will be necessary to make the diffusing force of the frosted glass considerably strong. Therefore, there has been a problem that the illumination efficiency will be so low that no bright illumination will be obtained and further, in the oblique light illumination, as the light is interrupted by knife-edging a part of the frosted glass which is a secondary light source, the light amount will reduce so much that no sufficient brightness will be obtained.

SUMMARY OF THE INVENTION

In view of the above mentioned circumstances, a primary object of the present invention is to provide a transmission type illuminating device simple in the formation wherein a uniform and bright illumination can be always made irrespective of the magnification and a wide uniform oblique light illumination can be also easily made.

According to the present invention, this object is attained by comprising as arranged in the order mentioned a light source, a collector lens, a pair of light source image forming lenses located in positions symmetrical with respect to the optical axis of the collector lens and a relay lens for light source images arranged on the optical axis of the collector lens. The light source is in a position conjugate with a sample placing surface with respect to the collector lens and relay lens for light source images and the pair of light source image forming lenses are so arranged that their respective optical axes may coincide respectively with a pair of beams from the light source to intersect at the center of the sample placing surface and to respectively enter the respective centers of a pair of entrance pupils of a stereomicroscope. A pair of light source images are respectively formed by the pair of light source image forming lenses in positions conjugate respectively with the pair of entrance pupils with respect to the relay lens for light source images.

According to a preferred formation of the present invention, the pair of light source image forming lenses are replaceably provided, the light source is arranged in the front side focus position of the collector lens and the distance between the pair of light source image forming lenses and the relay lens for light source images is made adjustable so that thereby a bright invariable Kohler illumination may be possible and, even if the position of the entrance pupil is moved by the magnification varying operation of the stereomicroscope, a favorable Kohler illumination may be made.

According to another preferred formation of the present invention, any one or all of the light source, collector lens and pair of light source image forming lenses are movable in the direction vertical to the optical axis and a diffusing plate is arranged near the light source image formed by the pair of light source image forming lenses so that thereby a wide uniform oblique light illumination may be easily realized as required and further a favorable oblique illumination having no sense of difference may be made in the three-dimensional view.

According to another further preferred formation of the present invention, the pair of light source image forming lenses are provided so as to be able to move into and out of the light path and will be moved out of the light path at the time of a high magnification so that thereby an invariable uniform illumination may be made at a low magnification and a bright efficient illumination may be made at a high magnification.

This and other objects of the present invention will become more apparent during the course of the following detailed description and appended claims.

BRIEF DESCRIPTION OF THE DRAWINGS

FIG. 1 is a view showing the optical system of a conventional transmission type illuminating device;

FIG. 2 is a view showing the optical system of an embodiment of the transmission type illuminating device according to the present invention; and FIGS. 3 to 6 are views respectively showing the optical systems of other respectively different embodiments of the transmission type illuminating device according to the present invention.

DESCRIPTION OF THE PREFERRED EMBODIMENTS

To explain the present invention in detail in the following on the basis of one embodiment shown in FIG. 2, the reference numeral 1 denotes a light source, 2 denotes a collector lens, 3, 3 denote a pair of light source image forming lenses consisting of convex lens located in positions symmetrical with respect to the optical axis of the collector lens 2 and 4 denotes a relay lens for light source images and consisting of a convex lens arranged on the same optical axis as of the collector lens 2 and they are arranged in the order mentioned to form an optical system of a transmission type illuminating device. The reference numeral 5 denotes a stage glass arranged in rear of the relay lens 4 for light source images and the sample placing surface of this stage glass 5 and the light source are in positions conjugate with respect to the collector lens 2 and relay lens 4. The reference numeral 6 denotes an objective lens, 7, 7 denote a pair of first image forming lenses located in positions symmetrical with respect to the optical axis of the objective lens 6, 8, 8 denote a pair of second image forming lens located in positions symmetrical also with respect to the optical axis of the objective lens 6, 9, 9 denote aperture stops arranged respectively between the first image forming lenses 7, 7 and second image forming lenses 8, 8, 10, 10 denote a pair of image rotator prisms arranged respectively in rear of the second image forming lenses 8, 8, 11, 11 denote a pair of eyepieces arranged respectively in rear of the image rotator prisms 10, 10 and they form an optical system of a stereomicroscope so that the image of a sample placed on the stage glass 5 may be formed as erect images in positions 12, 12 by the objective lens 6, first image forming lenses 7, 7, second image forming lenses 8, 8 and image rotator prisms 10, 10 and may be magnified by the eyepieces 11, 11 so as to be observed. The reference numerals 13, 13 denote entrance pupils of this stereomicroscope. The above mentioned pair of light source image forming lenses 3, 3 are so arranged that their respective optical axes may coincide respectively with a pair of main axial rays a, a, that is, rays coming out of the light source 1, intersecting at the center of the visual field of the sample placing surface and respectively entering the respective centers of the entrance pupils 13, 13 and a pair of light source images 14 (located respectively on the main axial rays a, a) by the light source image forming lenses 3, 3 may be in positions conjugate respectively with the entrance pupils 13, 13 with respect to relay lens 4 for light source images and stage glass 5. The above mentioned pair of light source image forming lenses 3, 3 are replaceably arranged.

As the transmission type illuminating device according to the present invention is formed as described above, the illuminating beams emitted from the light source 1 will be made substantially parallel beams by the collector lens 2, a part of these beams will be made to form the light source images 14, 14 by the light source image forming lenses 3, 3 and further these light source images 14, 14 will be formed as light source images 15, 15 in the entrance pupils 13, 13 by the relay lens 4 for light source images. Therefore, the illumination by the transmission type illuminating device by the present invention will become a Kohler illumination so that a bright invariable illumination may be possible. Further, the transmission type illuminating device according to the present invention is simple in the formation as described above.

The positions and apertures of the entrance pupils 13, 13 will vary with the magnification variation of the stereomicroscope. In such case, the light source image forming lenses 3, 3 may be replaced with those as shown by the chain lines in FIG. 2 so that the light source images 14, 14 of a size fitting the entrance pupils 13, 13 may be formed respectively in positions conjugate with the varied entrance pupils 13, 13. Therefore, even if the magnification of the stereomicroscope is varied, a favorable Kohler illumination will be able to be always made. By the way, instead of replacing the light source image forming lenses 3, 3, as indicated by the dotted lines in FIG. 2, the lenses 3, 3 may be formed respectively as groups of two lenses and by adding respectively another lens the distance between the two lenses may be made variable as indicated by the arrows so that the focal distance may be varied.

FIG. 3 shows the optical system of the second embodiment. Its fundamental formation is the same as of the first embodiment. However, the position of the light source 1 is made to coincide with the front side focus position of the collector lens 2 and the distance between the pair of light source image forming lenses 3, 3 and the relay lens 4 for light source images is made adjustable as indicated by the arrows. However, the relay lens 4 is formed as a group of two lenses. Therefore, the main axial rays a, a will become parallel between the light source image forming lenses 3, 3 and relay lens 4 and therefore, even if the distance between them varies, the conjugation between the light source 1 and the sample placing surface will be maintained. Therefore, when the positions of the entrance pupils 13, 13 are moved by the